(12) United States Patent
Li et al.

(10) Patent No.: US 12,407,171 B2
(45) Date of Patent: Sep. 2, 2025

(54) POWER CONVERSION MODULE AND POWER SUPPLY SYSTEM

(71) Applicant: Huawei Digital Power Technologies Co., Ltd., Shenzhen (CN)

(72) Inventors: Lin Li, Shanghai (CN); Zhiwu Xu, Shenzhen (CN); Haibin Guo, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 18/453,678

(22) Filed: Aug. 22, 2023

(65) Prior Publication Data

US 2023/0396068 A1    Dec. 7, 2023

Related U.S. Application Data

(63) Continuation of application No. PCT/CN2022/073902, filed on Jan. 26, 2022.

(30) Foreign Application Priority Data

Feb. 23, 2021  (CN) .......................... 202110200485.9

(51) Int. Cl.
*H02J 3/38* (2006.01)
*H02M 1/00* (2006.01)

(52) U.S. Cl.
CPC ........... *H02J 3/381* (2013.01); *H02J 2300/26* (2020.01); *H02J 2300/28* (2020.01);
(Continued)

(58) Field of Classification Search
CPC ............. H02J 3/381; H02J 2300/24–26; H02J 2300/28; Y02E 10/56; Y02E 10/76;
(Continued)

(56) References Cited

U.S. PATENT DOCUMENTS

| 8,773,077 | B1 | 7/2014 | Elmes et al. | |
| 2009/0218887 | A1* | 9/2009 | Ledenev | H02J 13/00 307/80 |

(Continued)

FOREIGN PATENT DOCUMENTS

| CN | 102843035 A | 12/2012 |
| CN | 202817835 U | 3/2013 |

(Continued)

OTHER PUBLICATIONS

English machine translation of CN102843035A published Dec. 26, 2012. (Year: 2012).*

(Continued)

*Primary Examiner* — Rexford N Barnie
*Assistant Examiner* — David A Shiao
(74) *Attorney, Agent, or Firm* — Conley Rose. P.C.

(57) ABSTRACT

A power conversion module includes a power transistor and a sampling control unit. The sampling control unit determines a given duty cycle of the power conversion module (Continued)

based on the bus reference duty cycle, the power supply reference duty cycle, and the current limiting reference duty cycle, and controls, based on the given duty cycle, the power transistor to work, to control the direct current bus to have a target bus voltage and enable the power conversion module to run at the maximum power point. In this application, the direct current bus can be stabilized and the power conversion module can be controlled to run at the maximum power point.

20 Claims, 8 Drawing Sheets

(52) U.S. Cl.
CPC ............ *H02M 1/0025* (2021.05); *Y02E 10/56* (2013.01); *Y02E 10/76* (2013.01)

(58) Field of Classification Search
CPC ............ H02M 1/0003; H02M 1/0012; H02M 1/0025; H02S 40/30–38
See application file for complete search history.

(56) References Cited

U.S. PATENT DOCUMENTS

| | | | | |
|---|---|---|---|---|
| 2015/0372615 | A1* | 12/2015 | Ayyanar | H02M 7/48 363/131 |
| 2019/0326758 | A1* | 10/2019 | Zhu | H02M 3/33573 |

FOREIGN PATENT DOCUMENTS

| | | | | |
|---|---|---|---|---|
| CN | 202856652 U | * | 4/2013 | |
| CN | 107147145 A | * | 9/2017 | ............ H02J 3/32 |
| CN | 107181275 A | * | 9/2017 | |
| CN | 106451547 B | | 5/2019 | |
| CN | 110829507 A | | 2/2020 | |

OTHER PUBLICATIONS

English machine translation of CN110829507A published Feb. 21, 2020. (Year: 2020).*
English machine translation of CN107181275A published Sep. 19, 2017. (Year: 2017).*
English machine translation of CN202856652U published Apr. 3, 2013. (Year: 2013).*
English machine translation of CN107147145A published Sep. 8, 2017. (Year: 2017).*

* cited by examiner

POWER CONVERSION MODULE AND POWER SUPPLY SYSTEM

CROSS-REFERENCE TO RELATED APPLICATIONS

This application is a continuation application of International Patent Application No. PCT/CN2022/073902 filed on Jan. 26, 2022, which claims priority to Chinese Patent Application No. 202110200485.9 filed on Feb. 23, 2021. The disclosures of the aforementioned applications are hereby incorporated by reference in their entireties.

TECHNICAL FIELD

This application relates to the field of electric power technologies, and in particular, to a power conversion module and a power supply system.

BACKGROUND

In a pure photovoltaic system or a photovoltaic system provided with energy storage, when the photovoltaic system runs off grid to supply power to a load, an energy storage battery or a photovoltaic unidirectional direct current (DC)/DC conversion module runs in a voltage source mode to provide a stable direct current bus voltage for the photovoltaic system. This ensures that the DC/alternating current (AC) conversion module can run normally to provide a high-quality alternating current voltage for the load. When the energy storage battery is in an offline state (for example, battery energy is insufficient, the energy storage battery is powered off or faulty, or no energy storage battery is configured), only the photovoltaic unidirectional DC/DC conversion module can provide a bus voltage. However, due to the special characteristics of a photovoltaic curve, when the system runs on a left side of a maximum power point, a bus is out of control, and consequently the system crashes and breaks down.

During research and practice, it is found that in the conventional technology, current limiting may be performed on a bus voltage loop to prevent the system from running on the left side of the maximum power point. However, a current at the maximum power point cannot be accurately determined because of a change of illumination. As a result, when a current-limit value of the bus voltage loop is less than the current at the maximum power point, the system cannot run to the maximum power point, causing a waste of energy, or when a current-limit value of the bus voltage loop is greater than the current of the maximum power point, the photovoltaic system still runs on the left side of the maximum power point because of a load change, causing the bus to be out of control. In addition, in the conventional technology, it may be further determined in real time whether the photovoltaic system runs on the left side of the maximum power point, and when the system runs on the left side of the maximum power point, current limiting is performed on a maximum current of the system and the bus voltage loop is controlled again. However, this causes system power to fluctuate repeatedly, and causes low stability.

SUMMARY

This application provides a power conversion module and a power supply system, to stabilize a direct current bus and control the power conversion module to run at a maximum power point, so that system stability is improved and applicability is high.

According to a first aspect, this application provides a power conversion module. The power conversion module is applicable to a power supply system, the power supply system further includes a power supply module and a direct current bus, the power supply module may be connected in parallel to the direct current bus by using the power conversion module, and the power conversion module may include a power transistor and a sampling control unit. The sampling control unit may be configured to track a maximum power point of the power supply module, and determine a bus reference voltage of the direct current bus and a power supply reference voltage of the power supply module based on the maximum power point of the power supply module, so that the bus reference voltage and the power supply reference voltage can be updated in real time by using the tracked maximum power point. The sampling control unit is further configured to determine a bus reference duty cycle based on the bus reference voltage, determine a power supply reference duty cycle based on the power supply reference voltage, and determine a current limiting reference duty cycle based on a preset current-limit value of the power conversion module. The sampling control unit is configured to determine a given duty cycle of the power conversion module based on the bus reference duty cycle, the power supply reference duty cycle, and the current limiting reference duty cycle, and control, based on the given duty cycle, the power transistor to work, to control the direct current bus to have a target bus voltage and enable the power conversion module to run at the maximum power point. In this application, an off-grid mode and an on-grid mode may be unified, to reduce complex mode switching. In addition, the given duty cycle of the power conversion module may be determined based on the bus reference duty cycle, the power supply reference duty cycle, and the current limiting reference duty cycle, to stabilize a bus voltage of the direct current bus and implement maximum power point tracking, so that system stability is improved and applicability is higher.

With reference to the first aspect, in a first possible implementation, the sampling control unit includes a bus voltage loop, a power supply voltage loop, and a current limiting loop, where the power supply voltage loop is a voltage loop configured to perform maximum power point tracking control on the power supply module. The bus voltage loop may be configured to determine the bus reference duty cycle based on the bus reference voltage of the direct current bus. The power supply voltage loop may be configured to determine the power supply reference duty cycle based on the power supply reference voltage of the power supply module. The current limiting loop is configured to determine the current limiting reference duty cycle based on the preset current-limit value of the power conversion module. In the power conversion module provided in this application, the off-grid mode and the on-grid mode may be unified, so that the bus voltage loop, the power supply voltage loop, and the current limiting loop are run in parallel, to reduce complex mode switching. In addition, the bus voltage loop, the power supply voltage loop, and the current limiting loop may directly determine the bus reference duty cycle, the power supply reference duty cycle, and the current limiting reference duty cycle, so that a response speed of the system is fast and applicability is higher.

With reference to the first possible implementation of the first aspect, in a second possible implementation, the sampling control unit is configured to determine, as the given duty cycle of the power conversion module, a smallest reference duty cycle among the bus reference duty cycle, the power supply reference duty cycle, and the current limiting reference duty cycle. When the smallest reference duty cycle is the bus reference duty cycle, the bus voltage loop outputs the given duty cycle of the power conversion module. It can be understood that, during on-grid operation or off-grid load shedding, the bus voltage loop controls the direct current bus. This can prevent the bus voltage of the direct current bus from increasing, thereby stabilizing the bus voltage of the direct current bus. When the smallest reference duty cycle is the power supply reference duty cycle, the power supply voltage loop outputs the given duty cycle of the power conversion module. It can be understood that, when the bus voltage is reduced during off-grid, the bus voltage loop fails in contention. In this case, the power supply voltage loop outputs the given duty cycle of the power conversion module, and a positive feedback is not formed in the bus voltage loop. This stabilizes the bus voltage of the direct current bus and improves system stability. When the smallest reference duty cycle is the current limiting reference duty cycle, the current limiting loop outputs the given duty cycle of the power conversion module. In this way, that overcurrent does not occur in a system current is ensured, and applicability is higher. In the power conversion module provided in this application, the bus voltage loop, the power supply voltage loop, and the current limiting loop may perform loop contention to stabilize the bus voltage of the direct current bus and implement maximum power point tracking, so that system stability is improved and applicability is higher.

With reference to the second possible implementation of the first aspect, in a third possible implementation, the sampling control unit is further configured to, when determining the bus reference duty cycle or the current limiting reference duty cycle as the given duty cycle of the power conversion module, control the power conversion module to run at the maximum power point. It can be understood that, when determining the bus reference duty cycle or the current limiting reference duty cycle as the given duty cycle of the power conversion module, the sampling control unit may determine that the power supply voltage loop fails in contention. In the power conversion module provided in this application, when the power supply voltage loop fails in contention, the power conversion module may be controlled to run at the maximum power point, so that the response speed of the system is fast and applicability is higher.

With reference to any one of the first possible implementation of the first aspect to the third possible implementation of the first aspect, in a fourth possible implementation, the bus voltage loop is a closed-loop controller, and the closed-loop controller is a proportional integral controller without a steady-state error or is another controller. The bus voltage loop is further configured to perform integral input clearing when the bus reference duty cycle is greater than the current given duty cycle of the power conversion module. In other words, when the bus reference duty cycle is greater than the current given duty cycle of the power conversion module, the bus voltage loop fails in contention and performs integral input clearing, so that the response speed of the system can be improved while an anti-saturation function is provided, and applicability is higher.

With reference to any one of the first possible implementation of the first aspect to the fourth possible implementation of the first aspect, in a fifth possible implementation, the power supply voltage loop is a closed-loop controller, and the closed-loop controller is a proportional integral controller without a steady-state error or is another controller. The power supply voltage loop is further configured to perform integral input clearing when the power supply reference duty cycle is greater than the current given duty cycle of the power conversion module. In other words, when the power supply reference duty cycle is greater than the current given duty cycle of the power conversion module, the power supply voltage loop fails in contention and performs integral input clearing, so that the response speed of the system can be improved while the anti-saturation function is provided, and applicability is higher.

With reference to any one of the first possible implementation of the first aspect to the fifth possible implementation of the first aspect, in a sixth possible implementation, the current limiting loop is a closed-loop controller, and the closed-loop controller is a proportional integral controller without a steady-state error or is another controller. The current limiting loop is further configured to perform integral input clearing when the current limiting reference duty cycle is greater than the current given duty cycle of the power conversion module. In other words, when the current limiting reference duty cycle is greater than the current given duty cycle of the power conversion module, the current limiting loop fails in contention and performs integral input clearing, so that the response speed of the system can be improved while the anti-saturation function is provided, a current of the power conversion module is controlled to be within a safe range, and applicability is higher.

According to a second aspect, this application provides a power supply system. The power supply system includes a power supply module, an energy storage module, a DC/DC conversion module, a direct current bus, a DC/AC conversion module, an on/off grid connection box, and the power conversion module provided in any one of the first aspect to the sixth possible implementation of the first aspect. The power supply module is connected in parallel to the direct current bus by using the power conversion module, the energy storage module is connected in parallel to the direct current bus by using the DC/DC conversion module, one end of the DC/AC conversion module is connected in parallel to the direct current bus, and the other end of the DC/AC conversion module is connected to an alternating current load or an alternating current power grid by using the on/off grid connection box. The power conversion module is configured to convert electrical energy provided by the power supply module into direct-current electrical energy, and output the direct-current electrical energy to the DC/AC converter. The DC/DC conversion module is configured to convert direct-current electrical energy provided by the energy storage module into target direct-current electrical energy, and output the target direct-current electrical energy to the DC/AC conversion module. The DC/AC conversion module is configured to convert the direct-current electrical energy that is input by the power conversion module and the target direct-current electrical energy that is input by the DC/DC conversion module into alternating-current electrical energy, and supply power to the alternating current load or the alternating current power grid by using the on/off grid connection box. In this application, after the power conversion module performs loop contention to stabilize a bus voltage of the direct current bus and implement maximum power point tracking, a stable direct current bus voltage can be provided for the DC/AC conversion module, and the power supply system runs at the maximum power point, so that power supply efficiency is higher and applicability is higher.

With reference to the second aspect, in a first possible implementation, in a hybrid photovoltaic and energy-storage power supply scenario, the power supply module is a photovoltaic array, and the power conversion module is a DC/DC conversion module.

With reference to the second aspect, in a second possible implementation, in a hybrid wind and energy-storage power supply scenario, the power supply module is a generator, and the power conversion module is an AC/DC conversion module.

In this application, an off-grid mode and an on-grid mode may be unified, to reduce complex mode switching. In addition, the given duty cycle of the power conversion module may be determined based on the bus reference duty cycle, the power supply reference duty cycle, and the current limiting reference duty cycle, to stabilize the bus voltage of the direct current bus and implement maximum power point tracking, so that system stability is improved and applicability is higher.

DESCRIPTION OF EMBODIMENTS

Figure 1:
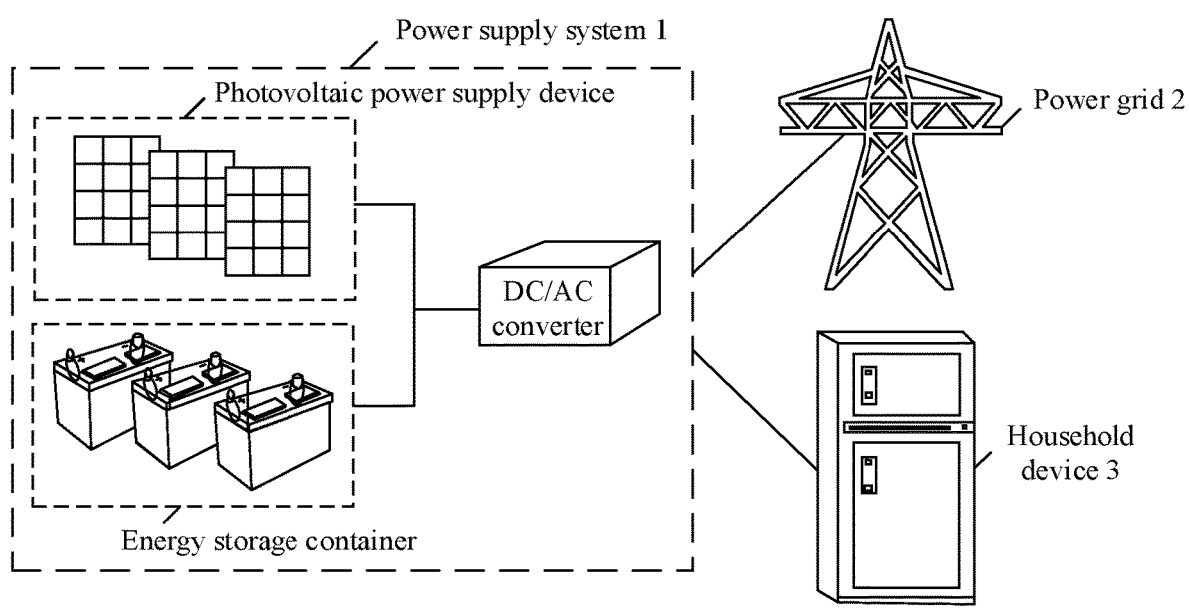
FIG. 1 is a schematic diagram of an application scenario of a power supply system according to this application.

New energy (NE) (or unconventional energy) has wide functions in people's life and work. One of the functions is to convert new energy into electrical energy. The new energy may include solar energy, geothermal energy, wind energy, marine energy, biomass energy, or other new energy. A power supply system provided in this application may be a hybrid power supply system based on new energy power generation and different types of energy storage modules. The new energy power generation may include solar power generation (for example, solar photovoltaic power generation or solar photothermal power generation), geothermal power generation, wind power generation, marine power generation (for example, wave power generation or tidal power generation), and biomass power generation. The new energy power generation has no moving parts, no noise, no pollution, high reliability, and other characteristics, and has excellent application prospects for communication power supply systems in remote regions. Components in different types of energy storage modules herein may include a lithium-ion battery, a lead-acid battery (or a lead-acid storage battery), a supercapacitor (or referred to as an electrochemical capacitor), and the like. Specific types of the components in the energy storage modules are not limited in this application. The power supply system provided in this application may be applicable to a plurality of types of power generation devices, such as base station equipment in a remote region with no mains supply or a poor mains supply, a photovoltaic power generation device, or a wind power generation device, or may be applicable to another electrical device (for example, a power grid, a household device, or an industrial and commercial electrical device). An application scope of the power supply system may be determined based on an actual application scenario, and is not limited herein.

The power supply system provided in this application may include a power supply module, an energy storage module, a direct current DC/DC conversion module (or a DC/DC converter), a direct current bus, a direct current DC/alternating current AC conversion module (or a DC/AC converter), an on/off grid connection box, and a power conversion module. The power supply module is connected in parallel to the direct current bus by using the power conversion module, the energy storage module is connected in parallel to the direct current bus by using the DC/DC conversion module, one end of the DC/AC conversion module is connected in parallel to the direct current bus, and the other end of the DC/AC conversion module is connected to an alternating current load or an alternating current power grid by using the on/off grid connection box. The energy storage module herein may include at least one battery cluster, and the battery clusters are connected in parallel. The power conversion module may convert electrical energy provided by the power supply module into direct-current electrical energy, and output the direct-current electrical energy to the DC/AC converter. The DC/DC conversion module may convert direct-current electrical energy provided by the energy storage module into target direct-current electrical energy, and output the target direct-current electrical energy to the DC/AC conversion module. The DC/AC conversion module may convert the direct-current electrical energy that is input by the power conversion module and the target direct-current electrical energy that is input by the DC/DC conversion module into alternating-current electrical energy, and supply power to the alternating current load or the alternating current power grid by using the on/off grid connection box. The following uses a hybrid photovoltaic and energy-storage power supply scenario as an example for description. Details are not described below again.

FIG. 1 is a schematic diagram of an application scenario of a power supply system according to this application. In a hybrid photovoltaic and energy-storage power supply scenario, a power supply module is a photovoltaic array, and the foregoing power conversion module is a DC/DC conversion module (or a DC/DC converter). As shown in FIG. 1, the power supply system (for example, a power supply system 1) may include a photovoltaic power supply device, an energy storage container, and a DC/AC converter. The photovoltaic power supply device may include a photovoltaic array and the DC/DC converter. The photovoltaic array may include a plurality of photovoltaic module strings connected in parallel. A photovoltaic module may also be referred to as a solar panel or a photovoltaic panel. The energy storage container herein may include at least one battery cluster and a DC/DC converter, the battery clusters are connected in parallel, and one battery cluster may include a plurality of battery strings connected in series. The battery string may be a battery pack, and one battery pack may include one battery unit or a plurality of battery units (a voltage of the battery unit is usually between 2.5 volts (V) and 4.2 V) connected in series and in parallel, to form a smallest energy storage and management unit. After the power supply system 1 starts to work, in the photovoltaic power supply device, the photovoltaic array may convert solar energy into electrical energy (that is, direct-current electrical energy), and output the electrical energy to the DC/DC converter. The DC/DC converter may convert the electrical energy input by the photovoltaic array into direct-current electrical energy, and output the direct-current electrical energy to the DC/AC converter. In this way, the photovoltaic power supply device outputs the direct-current electrical energy to the DC/AC converter. In the energy storage container, each of the at least one battery cluster may output direct-current electrical energy to the DC/DC converter, and the DC/DC converter may convert the direct-current electrical energy input by each battery cluster into target direct-current electrical energy and output the target direct-current electrical energy to the DC/AC converter. In this way, the energy storage container outputs the target direct-current electrical energy to the DC/AC converter. In this case, the DC/AC converter may convert the direct-current electrical energy input by the photovoltaic power supply device and the target direct-current electrical energy input by the energy storage container into alternating-current electrical energy, and output the alternating-current electrical energy to an alternating current power grid (for example, a power grid 2) or an alternating current load (for example, a household device 3), to supply power to the power grid 2 or the household device 3.

With reference to FIG. 2 to FIG. 8, the following describes the power supply system and the power conversion module that are provided in this application and working principles of the power supply system and the power conversion module by using examples.

Figure 2:
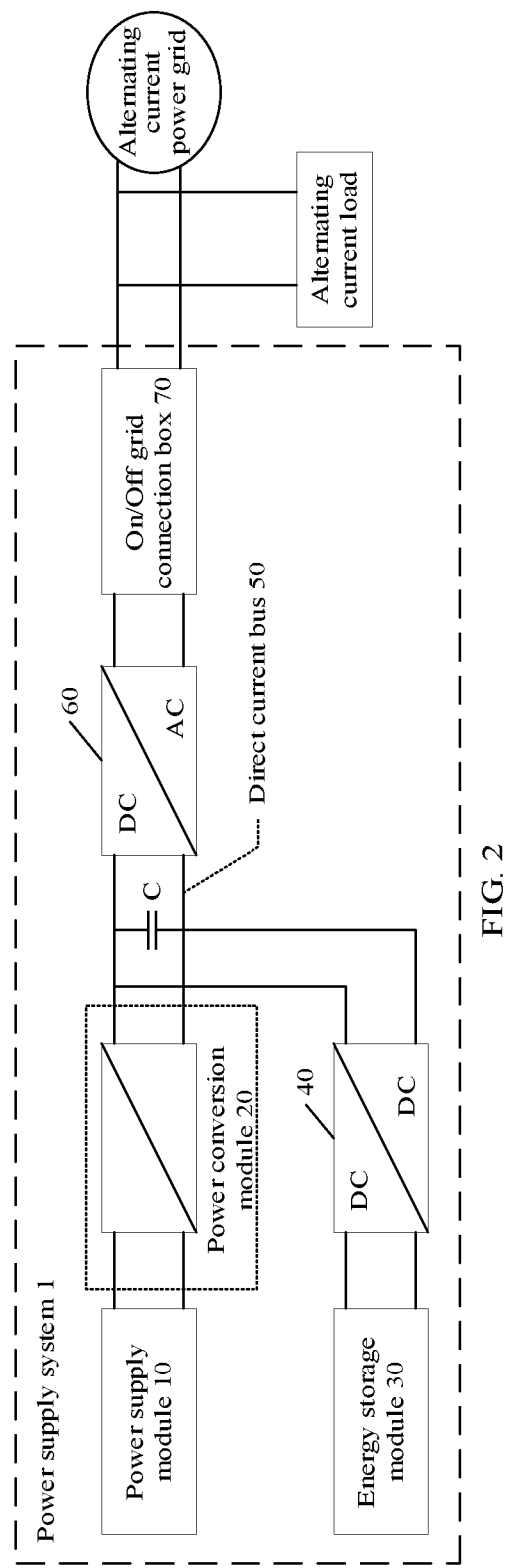
FIG. 2 is a schematic diagram of a structure of a power supply system according to this application.

FIG. 2 is a schematic diagram of a structure of a power supply system according to this application. As shown in FIG. 2, the power supply system 1 may include a power supply module 10, a power conversion module 20, an energy storage module 30, a DC/DC conversion module 40, a direct current bus 50, a DC/AC conversion module 60, and an on/off grid connection box 70. The power supply module 10 may be connected in parallel to the direct current bus 50 by using the power conversion module 20, the energy storage module 30 is connected in parallel to the direct current bus 50 by using the DC/DC conversion module 40, one end of the DC/AC conversion module 60 is connected in parallel to the direct current bus 50, and the other end of the DC/AC conversion module 60 is connected to an alternating current load or an alternating current power grid by using the on/off grid connection box 70. The power conversion module 20 herein may be an AC/DC conversion module or a unidirectional DC/DC conversion module, and a circuit topology of the power conversion module 20 may be a bootstrap circuit, which may be referred to as a boost (BST) circuit. Therefore, the power conversion module may also be referred to as a BST conversion module or a BST converter. The foregoing DC/DC conversion module 40 may be a bidirectional DC/DC conversion module. Optionally, the direct current bus 50 may include one bus capacitor or a plurality of bus capacitors connected in series. For example, as shown in FIG. 2, the direct current bus 50 includes a bus capacitor C.

In some feasible implementations, in a hybrid photovoltaic and energy-storage power supply scenario, the power supply module 10 may be a photovoltaic array, and the power conversion module 20 may be a unidirectional DC/DC conversion module. The photovoltaic array may convert solar energy into electrical energy (that is, direct-current electrical energy), and output the electrical energy to the unidirectional DC/DC conversion module. The unidirectional DC/DC conversion module may convert the electrical energy input by the photovoltaic array into direct-current electrical energy, and output the direct-current electrical energy to the DC/AC conversion module 60. The energy storage module 30 may output direct-current electrical energy to the DC/DC conversion module 40. The DC/DC conversion module 40 may convert the direct-current electrical energy input by the energy storage module 30 into target direct-current electrical energy, and output the target direct-current electrical energy to the DC/AC conversion module 60. Further, the DC/AC conversion module 60 may convert the direct-current electrical energy input by the unidirectional DC/DC conversion module and the target direct-current electrical energy input by the DC/DC conversion module 40 into alternating-current electrical energy, and output the alternating-current electrical energy to the alternating current power grid or the alternating current load by using the on/off grid connection box 70, to supply power to the alternating current power grid or the alternating current load.

In some feasible implementations, in a hybrid wind and energy-storage power supply scenario, the power supply module 10 is a generator, and the power conversion module 20 is an AC/DC conversion module (or an AC/DC converter). The generator may convert wind energy into alternating-current electrical energy, and output the alternating-current electrical energy to the AC/DC conversion module. The AC/DC conversion module may convert the alternating-current electrical energy input by the generator into direct-current electrical energy, and output the direct-current electrical energy to the DC/AC conversion module 60. The energy storage module 30 may output direct-current electrical energy to the DC/DC conversion module 40. The DC/DC conversion module 40 may convert the direct-current electrical energy input by the energy storage module 30 into target direct-current electrical energy, and output the target direct-current electrical energy to the DC/AC conversion module 60. Further, the DC/AC conversion module 60 may convert the direct-current electrical energy input by the AC/DC conversion module and the target direct-current electrical energy input by the DC/DC conversion module 40 into alternating-current electrical energy, and output the alternating-current electrical energy to the alternating current power grid or the alternating current load by using the on/off grid connection box 70, to supply power to the alternating current power grid or the alternating current load.

In some feasible implementations, when the alternating current power grid is powered off or the power supply system 1 runs off grid to supply power to the alternating current load, the DC/AC conversion module 60 needs to provide high-quality alternating-current electrical energy for the alternating current load. In this case, the power conversion module 20 or the DC/DC conversion module 40 runs in a voltage source mode to provide a stable bus voltage (that is, a direct current bus voltage) for the DC/AC conversion module 60. This ensures that the DC/AC conversion module 60 runs normally to provide the high-quality alternating-current electrical energy for the alternating current load. Optionally, when no energy storage module 30 is configured in the power supply system 1, energy of the energy storage module 30 is insufficient, the energy storage module 30 is powered off, or the energy storage module 30 is faulty, it may indicate that the energy storage module 30 is in an offline state. In this case, the power conversion module 20 runs in a voltage source mode to provide a stable bus voltage for the DC/AC conversion module 60. In addition, to prevent the power supply system 1 from running on a left side of a maximum power point, causing the direct current bus 50 to be out of control, the power conversion module 20 needs to run at the maximum power point. It can be learned that, when the alternating current power grid is powered off, the power supply system 1 runs off grid to supply power to the alternating current load, or the energy storage module 30 is in the offline state, the power conversion module 20 needs to run at the maximum power point and provide a stable bus voltage for the DC/AC conversion module 60.

Figure 3:
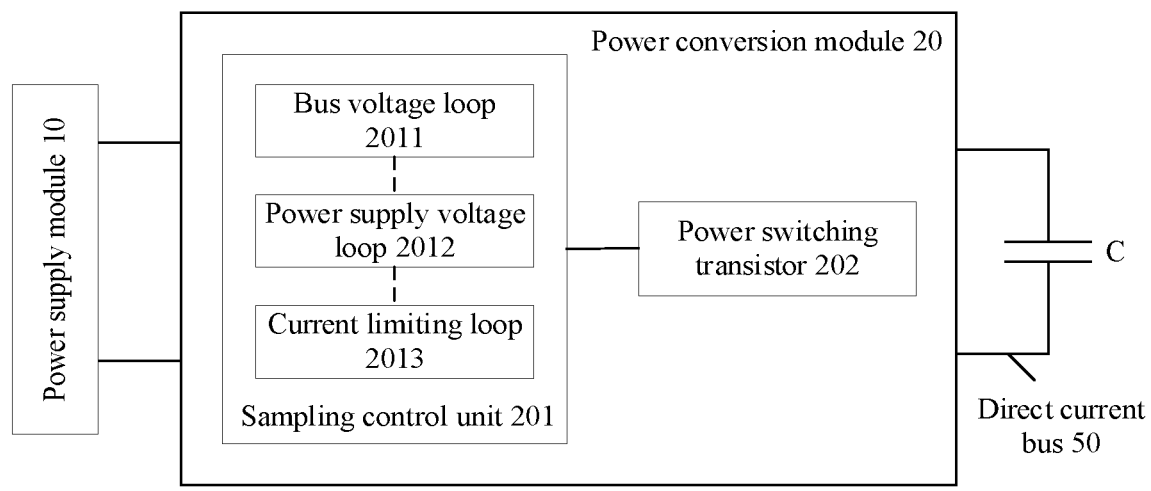
FIG. 3 is a schematic diagram of a structure of a power conversion module according to this application.

Further, refer to FIG. 3. FIG. 3 is a schematic diagram of a structure of a power conversion module according to this application. As shown in FIG. 3, the power conversion module 20 shown in FIG. 2 may include a sampling control unit 201 and a power switching transistor 202. The power switching transistor 202 may be a bidirectional power transistor. The sampling control unit 201 may include a bus voltage loop 2011, a power supply voltage loop 2012, and a current limiting loop 2013. The power supply voltage loop 2012 is a voltage loop configured to perform maximum power point tracking (MPPT) control on the power supply module 10. In this application, an optimal operating point of the power supply module 10 (for example, the photovoltaic array) may be referred to as a maximum power point. For ease of description, the following uses the photovoltaic array as an example for description. Because the maximum power point of the photovoltaic array mainly depends on an operating temperature and an illumination intensity of the photovoltaic array, and the maximum power point of the photovoltaic array varies with different operating temperatures and illumination intensities, photovoltaic maximum power point tracking may be performed on the photovoltaic array by using the power supply voltage loop 2012, so that the photovoltaic array works at the maximum power point as much as possible. In this application, one or more functional units or hardware devices that are in the power conversion module and that have a sampling function and a control logic function may be collectively referred to as the sampling control unit.

In some feasible implementations, the sampling control unit 201 may track the maximum power point of the power supply module 10 in real time, and determine a bus reference voltage of the direct current bus 50 and a power supply reference voltage of the power supply module 10 based on the maximum power point of the power supply module 10. The sampling control unit 201 may determine a bus reference duty cycle based on the bus reference voltage, determine a power supply reference duty cycle based on the power supply reference voltage, and determine a current limiting reference duty cycle based on a preset current-limit value of the power conversion module 20. The preset current-limit value herein may be a maximum operating current value configured inside the power conversion module 20, or a maximum operating current value set by a user based on the power conversion module 20. This may be determined based on an actual application scenario, and is not limited herein. Further, the sampling control unit 201 may determine a given duty cycle of the power conversion module 20 based on the bus reference duty cycle, the power supply reference duty cycle, and the current limiting reference duty cycle, and control, based on the given duty cycle, the power switching transistor 202 to work, to control the direct current bus 50 to have a target bus voltage (that is, a voltage at two ends of the bus capacitor C) and enable the power conversion module 20 to run at the maximum power point. In this application, an actual duty cycle used to control the power conversion module to work may be referred to as the given duty cycle. The target bus voltage herein may be a bus voltage value within a preset bus voltage range, to stabilize a bus voltage of the direct current bus 50. In this case, the power conversion module 20 can provide a stable bus voltage for the DC/AC conversion module so that the DC/AC conversion module 60 provides high-quality alternating-current electrical energy for the alternating current load. In addition, when the power conversion module 20 runs at the maximum power point, the power supply system 1 can run at the maximum power point, so that power supply efficiency is higher and applicability is higher.

In some feasible implementations, the sampling control unit 201 may collect a current output voltage and/or a current output current of the power supply module 10 in real time based on the sampling function of the sampling control unit 201, and process the current output voltage and/or the current output current of the power supply module 10 by using a perturbation and observation method, an incremental conductance method, a current sweep method, or another manner, to obtain the maximum power point of the power supply module 10. It can be understood that, the maximum power point of the power supply module 10 varies with different operating temperatures and/or illumination intensities. In this case, the bus reference voltage and the power supply reference voltage also vary with the maximum power point. Therefore, the bus reference voltage and the power supply reference voltage can be updated in real time by using the tracked maximum power point. For example, when the maximum power point increases, the bus reference voltage and the power supply reference voltage also increase. Further, the sampling control unit 201 may determine the bus reference voltage of the direct current bus 50 and the power supply reference voltage of the power supply module 10 based on the maximum power point of the power supply module 10 that is tracked in real time.

Figure 4:
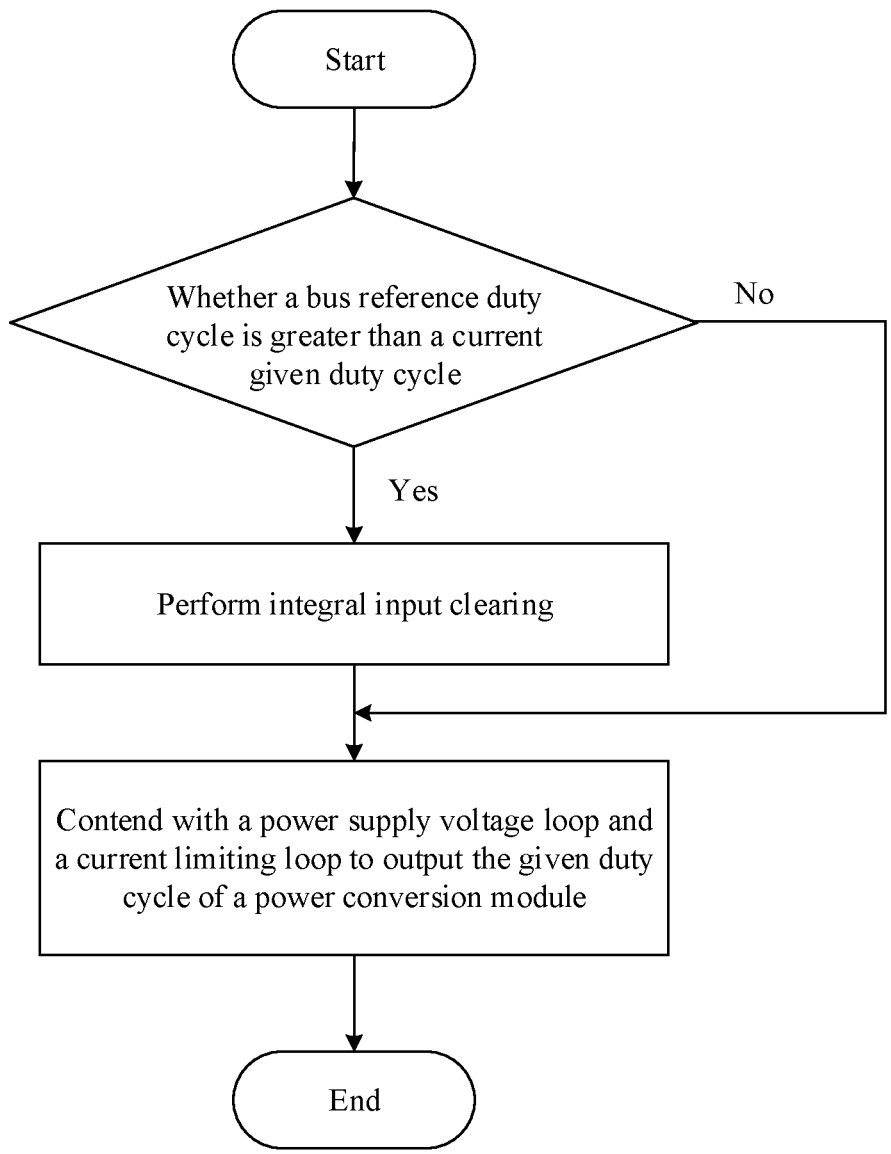
FIG. 4 is a schematic diagram of a working procedure for a bus voltage loop according to this application.

In some feasible implementations, the bus voltage loop 2011 may determine the bus reference duty cycle based on the bus reference voltage of the direct current bus 50. The bus reference duty cycle herein can be understood as a drive signal that is extracted by the bus voltage loop 2011 from the bus reference voltage and that is in direct proportion to the bus reference voltage. For example, the drive signal may be a pulse-width modulation (PWM) signal of a switch, and may be referred to as a PWM signal for short. For example, 1 in the PWM signal may indicate turn-on of the switch, and 0 in the PWM signal may indicate turn-off of the switch. The bus voltage loop 2011 may be a closed-loop controller (or as a negative feedback controller). The closed-loop controller may be a proportional integral (PI) controller without a steady-state error or may be another controller. The PI controller herein is a linear controller. FIG. 4 is a schematic diagram of a working procedure for a bus voltage loop according to this application. As shown in FIG. 4, when the bus reference duty cycle is greater than the current given duty cycle of the power conversion module 20, the bus voltage loop 2011 may perform integral input clearing, so that a response speed of the system can be improved while an anti-saturation function is provided, and applicability is higher. Otherwise, when the bus reference duty cycle is less than or equal to the current given duty cycle of the power conversion module 20, the bus voltage loop 2011 may contend with the power supply voltage loop 2012 and the current limiting loop 2013 for outputting the given duty cycle of the power conversion module 20.

Figure 5:
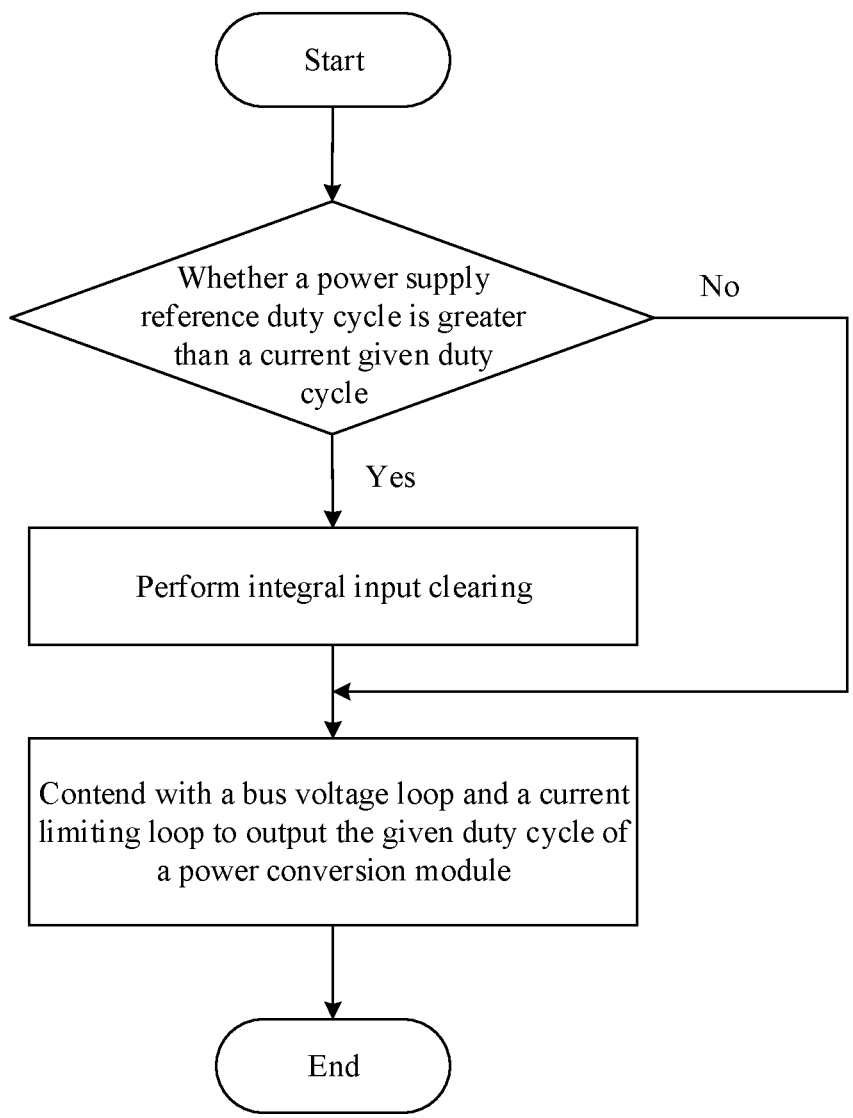
FIG. 5 is a schematic diagram of a working procedure for a power supply voltage loop according to this application.

In some feasible implementations, the power supply voltage loop 2012 may determine the power supply reference duty cycle based on the power supply reference voltage of the power supply module 10. The power supply reference duty cycle herein can be understood as a drive signal that is extracted by the power supply voltage loop 2012 from the power supply reference voltage and that is in direct proportion to the power supply reference voltage. For example, the drive signal is a PWM signal. The power supply voltage loop 2012 may be a closed-loop controller. The closed-loop controller is a PI controller without a steady-state error or is another controller. FIG. 5 is a schematic diagram of a working procedure for a power supply voltage loop according to this application. As shown in FIG. 5, when the power supply reference duty cycle is greater than the current given duty cycle of the power conversion module 20, the power supply voltage loop 2012 may perform integral input clearing, so that the response speed of the system can be improved while the anti-saturation function is provided, and applicability is higher. Otherwise, when the power supply reference duty cycle is less than or equal to the current given duty cycle of the power conversion module 20, the power supply voltage loop 2012 may contend with the bus voltage loop 2011 and the current limiting loop 2013 for outputting the given duty cycle of the power conversion module 20.

Figure 6:
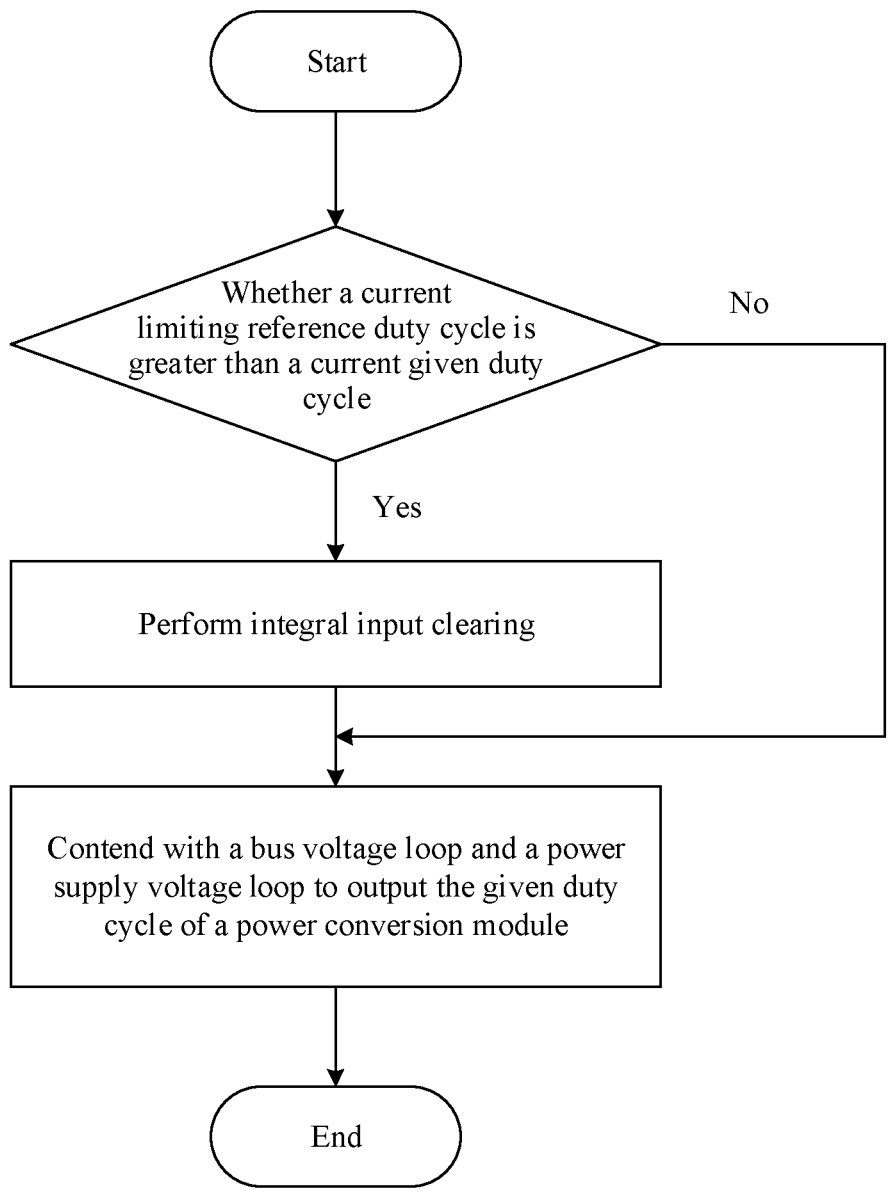
FIG. 6 is a schematic diagram of a working procedure for a current limiting loop according to this application.

In some feasible implementations, the current limiting loop 2013 may determine the current limiting reference duty cycle based on the preset current-limit value of the power conversion module 20. The current limiting reference duty cycle herein can be understood as a drive signal that is extracted by the current limiting loop 2013 from the preset current-limit value and that is in direct proportion to the preset current-limit value. For example, the drive signal is a PWM signal. The current limiting loop 2013 may be a closed-loop controller. The closed-loop controller is a PI controller without a steady-state error or is another controller. FIG. 6 is a schematic diagram of a working procedure for a current limiting loop according to this application. As shown in FIG. 6, when the current limiting reference duty cycle is greater than the current given duty cycle of the power conversion module 20, the current limiting loop 2013 may perform integral input clearing, so that the response speed of the system can be improved while an anti-saturation function is provided, a current of the power conversion module is controlled to be within a safe range, and applicability is higher. Otherwise, when the current limiting reference duty cycle is less than or equal to the current given duty cycle of the power conversion module 20, the current limiting loop 2013 may contend with the bus voltage loop 2011 and the power supply voltage loop 2012 for outputting the given duty cycle of the power conversion module 20.

In some feasible implementations, the sampling control unit 201 may determine a smallest reference duty cycle from the bus reference duty cycle, the power supply reference duty cycle, and the current limiting reference duty cycle, and determine the smallest reference duty cycle as the given duty cycle of the power conversion module 20. When the smallest reference duty cycle is the bus reference duty cycle, the bus voltage loop 2011 outputs the given duty cycle of the power conversion module 20. In this case, the bus voltage loop 2011 succeeds in contention, the power supply voltage loop 2012 and the current limiting loop 2013 fail in contention, and the sampling control unit 201 may control the power conversion module 20 to run at the maximum power point. It can be understood that, during on-grid operation or off-grid load shedding, the bus voltage loop 2011 controls the direct current bus 50. This can prevent the bus voltage of the direct current bus 50 from increasing, thereby stabilizing the bus voltage of the direct current bus 50.

In some feasible implementations, when the smallest reference duty cycle is the power supply reference duty cycle, the power supply voltage loop 2012 outputs the given duty cycle of the power conversion module 20. In this case, the power supply voltage loop 2012 succeeds in contention, and the bus voltage loop 2011 and the current limiting loop 2013 fail in contention. It can be understood that, when the bus voltage is reduced during off-grid, the bus voltage loop 2011 fails in contention. In this case, the power supply voltage loop 2012 outputs the given duty cycle of the power conversion module 20 and continues to track the maximum power point of the power supply module 10, and a positive feedback is not formed in the bus voltage loop 2011. This stabilizes the bus voltage of the direct current bus 50 and improves system stability.

In some feasible implementations, when the smallest reference duty cycle is the current limiting reference duty cycle, the current limiting loop 2013 outputs the given duty cycle of the power conversion module 20. In this case, the current limiting loop 2013 succeeds in contention, the bus voltage loop 2011 and the power supply voltage loop 2012 fail in contention, and the sampling control unit 201 may control the power conversion module 20 to run at the maximum power point. It can be understood that, in a case in which the bus reference duty cycle is greater than the current limiting reference duty cycle and the power supply reference duty cycle is greater than the current limiting reference duty cycle, to ensure that overcurrent does not occur in a system current, the sampling control unit 201 may control the current limiting loop 2013 to output the given duty cycle of the power conversion module 20, and applicability is higher. It can be learned that, when determining the bus reference duty cycle or the current limiting reference duty cycle as the given duty cycle of the power conversion module 20, the sampling control unit 201 may control the power conversion module 20 to run at the maximum power point. In other words, the sampling control unit 201 may control the power conversion module 20 to run at the maximum power point when the power supply voltage loop 2012 fails in contention.

Figure 7:
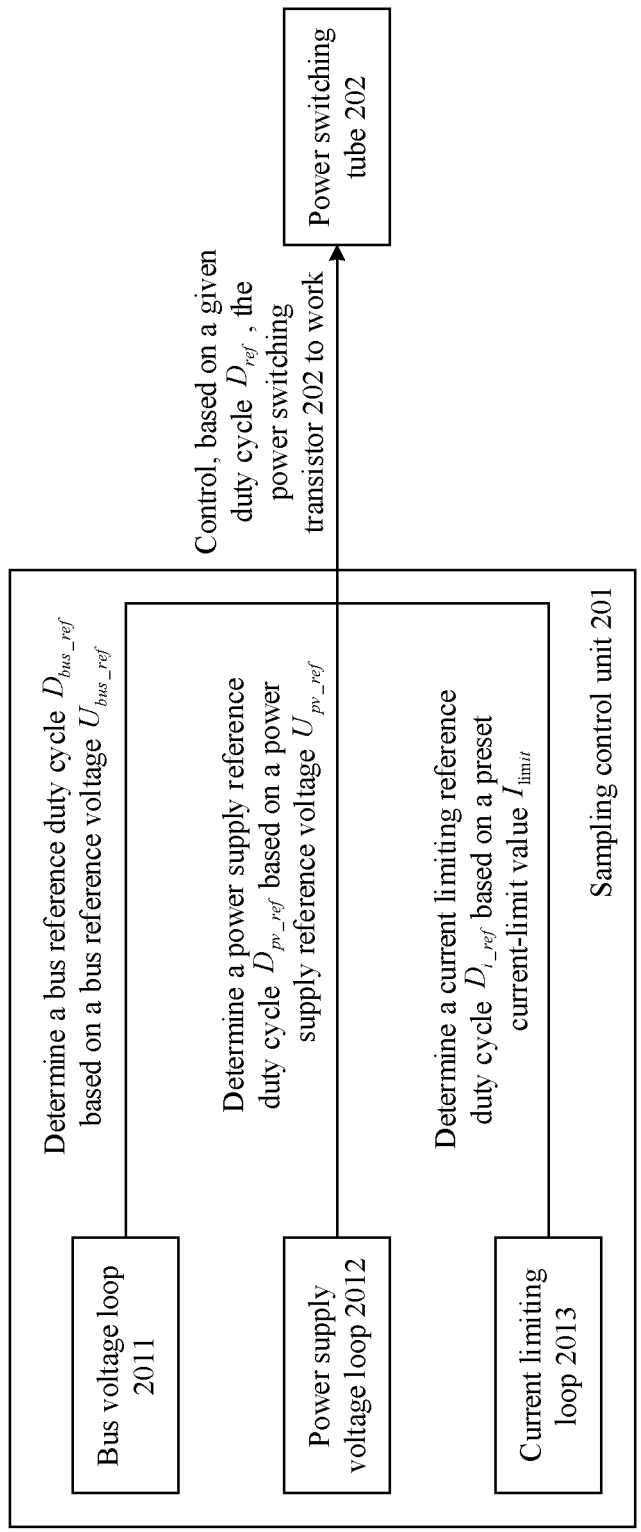
FIG. 7 is a schematic diagram of a working procedure for a power conversion module according to this application.

FIG. 7 is a schematic diagram of a working procedure for a power conversion module according to this application. As shown in FIG. 7, a bus voltage loop 2011 may determine a bus reference duty cycle (for example, which may be represented as $D_{bus\_ref}$) based on a bus reference voltage (for example, which may be represented as $U_{bus\_ref}$). A power supply voltage loop 2012 may determine a power supply reference duty cycle (for example, which may be represented as $D_{pv\_ref}$) based on a power supply reference voltage (for example, which may be represented as $U_{pv\_ref}$). A current limiting loop 2013 may determine a current limiting reference duty cycle (for example, which may be represented as $D_{i\_ref}$) based on a preset current-limit value (for example, which may be represented as $I_{limit}$). In this case, a sampling control unit 201 may determine, as a given duty cycle (for example, which may be represented as $D_{ref}$) of the power conversion module 20, a smallest duty cycle among the bus reference duty cycle $D_{bus\_ref}$, the power supply reference duty cycle $D_{pv\_ref}$ and the current limiting reference duty cycle $D_{i\_ref}$ and control, based on the given duty cycle $D_{ref}$, a power switching transistor 202 to work.

Figure 8:
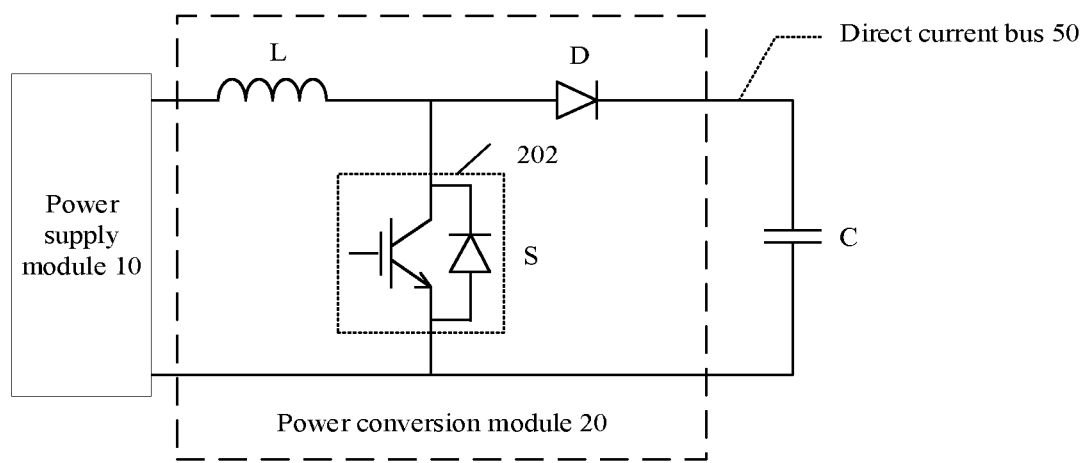
FIG. 8 is a schematic diagram of a circuit of a power conversion module according to this application.

In some feasible implementations, the power switching transistor 202 may be an insulated-gate bipolar transistor (IGBT), a metal-oxide-semiconductor field-effect transistor (MOSFET), or a diode made of a silicon (Si) semiconductor material, a third-generation wide bandgap semiconductor material such as silicon carbide (SiC), gallium nitride (GaN), diamond, or zinc oxide (ZnO), or made of another material. This may be further determined based on an actual application scenario, and is not limited herein. FIG. 8 is a schematic diagram of a circuit of a power conversion module according to this application. As shown in FIG. 8, the power conversion module 20 may include a filter inductor L, a diode D, and a power switching transistor 202, and the power switching transistor 202 includes a switch S (IGBT). One end of the filter inductor L i=s connected to a power supply module 10, the other end of the filter inductor L is connected to one end of the diode D and a collector of the switch S, an emitter of the switch S is connected to one end of the power supply module 10 and one end of a bus capacitor C, a base of the switch S may be connected to a sampling control unit 201, and the other end of the bus capacitor C is connected to the other end of the diode D. The bus capacitor C herein can be understood as an output capacitor of the power conversion module 20. After determining a given duty cycle of the power conversion module 20, the sampling control unit 201 may control, based on the given duty cycle, the switch S to work, to stabilize a bus voltage of a direct current bus 50 and enable the power conversion module 20 to run at a maximum power point. In this case, the power conversion module 20 can provide a stable bus voltage for a DC/AC conversion module 60, so that the DC/AC conversion module 60 provides high-quality alternating-current electrical energy for an alternating current load. In addition, when the power conversion module 20 runs at the maximum power point, a power supply system 1 can run at the maximum power point, so that power supply efficiency is higher and applicability is higher.

In this application, an off-grid mode and an on-grid mode may be unified, so that the bus voltage loop, the power supply voltage loop, and the current limiting loop are run in parallel, to reduce complex mode switching. In addition, loop contention may be performed to stabilize the bus voltage of the direct current bus and implement maximum power point tracking, so that system stability is improved, the response speed of the system is fast, and applicability is higher.

The foregoing descriptions are merely specific implementations of this application, but are not intended to limit the protection scope of the present disclosure. Any variation or replacement readily figured out by a person skilled in the art within the technical scope disclosed in this application shall fall within the protection scope of the present disclosure. Therefore, the protection scope of this application shall be subject to the protection scope of the claims.

What is claimed is:

1. A power conversion system, comprising:
    a power transistor; and
    a sampling controller coupled to the power transistor and configured to:
        track a maximum power point of a power supplier of a power supply system;
        determine a bus reference voltage of a direct current (DC) bus of the power supply system and a power supply reference voltage of the power supplier based on the maximum power point, wherein the power conversion system couples the power supplier in parallel to the DC bus;
        determine a bus reference duty cycle based on the bus reference voltage;
        determine a power supply reference duty cycle based on the power supply reference voltage;
        determine a current limiting reference duty cycle based on a preset current-limit value of the power conversion system;
        determine a given duty cycle of the power conversion system identified from the bus reference duty cycle, the power supply reference duty cycle, and the current limiting reference duty cycle;
        identify whether the bus reference duty cycle is greater than a current value of the given duty cycle of the power conversion system;
        perform, in response to identifying that the bus reference duty cycle is greater than the current value of the given duty cycle, clearing of an integral input of a linear controller of the power conversion system used to determine the bus reference duty cycle; and
        control, based on the given duty cycle, the power transistor to work, to control the DC bus to have a target bus voltage, and enable the power conversion system to run at the maximum power point.

2. The power conversion system of claim 1, wherein the sampling controller comprises:
    a power supply voltage loop configured to:
        perform maximum power point tracking control on the power supplier; and
        determine the power supply reference duty cycle based on the power supply reference voltage;
    a bus voltage loop coupled to the power supply voltage loop and configured to determine the bus reference duty cycle based on the bus reference voltage; and
    a current limiting loop coupled to the power supply voltage loop and configured to determine the current limiting reference duty cycle based on the preset current-limit value.

3. The power conversion system of claim 2, wherein the sampling controller is further configured to determine a smallest reference duty cycle among the bus reference duty cycle, the power supply reference duty cycle, and the current limiting reference duty cycle as the given duty cycle, wherein the bus voltage loop is further configured to output the given duty cycle when the smallest reference duty cycle is the bus reference duty cycle, wherein the power supply voltage loop is further configured to output the given duty cycle when the smallest reference duty cycle is the power supply reference duty cycle, and wherein the current limiting loop is further configured to output the given duty cycle when the smallest reference duty cycle is the current limiting reference duty cycle.

4. The power conversion system of claim 3, wherein the sampling controller is further configured to:
    identify the bus reference duty cycle or the current limiting reference duty cycle as the given duty cycle; and
    control, in response to identifying the bus reference duty cycle or the current limiting reference duty cycle as the given duty cycle, the power conversion system to run at the maximum power point.

5. The power conversion system of claim 2, wherein the bus voltage loop is a closed-loop controller comprising the linear controller, wherein the closed-loop controller is a proportional integral controller without a steady-state error.

6. The power conversion system of claim 2, wherein the power supply voltage loop is a closed-loop controller, wherein the closed-loop controller is a proportional integral controller without a steady-state error, and wherein the power supply voltage loop is further configured to:
    identify that the power supply reference duty cycle is greater than the current value of the given duty cycle of the power conversion system; and
    perform, in response to identifying that the power supply reference duty cycle is greater than the current value of the given duty cycle, clearing of the integral input of the proportional integral controller.

7. The power conversion system of claim 2, wherein the current limiting loop is a closed-loop controller, wherein the closed-loop controller is a proportional integral controller without a steady-state error, and wherein the current limiting loop is further configured to:
identify that the current limiting reference duty cycle is greater than the current value of the given duty cycle of the power conversion system; and
perform, in response to identifying that the current limiting reference duty cycle is greater than the current value of the given duty cycle, clearing of the integral input of the proportional integral controller.

8. A power supply system comprising:
a power converter comprising:
a power transistor; and
a sampling controller;
a direct current (DC) bus configured to have a bus reference voltage;
a DC/DC conversion system;
a power supplier coupled in parallel to the DC bus using the power converter and configured to have a maximum power point and a power supply reference voltage;
an energy storage system coupled in parallel to the DC bus using the DC/DC conversion system;
an on/off grid connection box; and
a DC/alternating current (AC) conversion system comprising:
a first end coupled in parallel to the DC bus; and
a second end coupled to an AC load or an AC power grid using the on/off grid connection box,
wherein the sampling controller is configured to:
track the maximum power point;
determine the bus reference voltage and the power supply reference voltage based on the maximum power point;
determine a bus reference duty cycle based on the bus reference voltage;
determine a power supply reference duty cycle based on the power supply reference voltage;
determine a current limiting reference duty cycle based on a preset current-limit value of the power converter;
determine a given duty cycle of the power converter identified from the bus reference duty cycle, the power supply reference duty cycle, and the current limiting reference duty cycle of the power converter;
identify whether the bus reference duty cycle is greater than a current value of the given duty cycle of the power converter;
perform, in response to identifying that the bus reference duty cycle is greater than the current value of the given duty cycle, clearing of an integral input of a linear controller of the power converter used to determine the bus reference duty cycle; and
control, based on the given duty cycle, the power transistor to work to control the DC bus to have a target bus voltage, and enable the power converter to run at the maximum power point.

9. The power supply system of claim 8, wherein the power converter is another DC/DC conversion system, and wherein the power supplier is a photovoltaic array.

10. The power supply system of claim 8, wherein the power converter is an AC/DC conversion system, and wherein the power supplier is a generator.

11. The power supply system of claim 8, wherein the sampling controller comprises:
a power supply voltage loop configured to:
perform maximum power point tracking control on the power supplier; and
determine the power supply reference duty cycle based on the power supply reference voltage;
a bus voltage loop coupled to the power supply voltage loop and configured to determine the bus reference duty cycle based on the bus reference voltage; and
a current limiting loop coupled to the power supply voltage loop and configured to determine the current limiting reference duty cycle based on the preset current-limit value.

12. The power supply system of claim 11, wherein the sampling controller is further configured to determine a smallest reference duty cycle among the bus reference duty cycle, the power supply reference duty cycle, and the current limiting reference duty cycle as the given duty cycle, wherein the bus voltage loop is further configured to output the given duty cycle when the smallest reference duty cycle is the bus reference duty cycle, wherein the power supply voltage loop is further configured to output the given duty cycle when the smallest reference duty cycle is the power supply reference duty cycle; and wherein the current limiting loop is further configured to output the given duty cycle when the smallest reference duty cycle is the current limiting reference duty cycle.

13. The power supply system of claim 11, wherein the bus voltage loop is a closed-loop controller comprising the linear controller, wherein the closed-loop controller is a proportional integral controller without a steady-state error.

14. The power supply system of claim 11, wherein the power supply voltage loop is a closed-loop controller, wherein the closed-loop controller is a proportional integral controller without a steady-state error, and wherein the power supply voltage loop is further configured to:
identify that the power supply reference duty cycle is greater than the current value of the given duty cycle; and
perform, in response to identifying that the power supply reference duty cycle is greater than the current value of the given duty cycle, clearing of the integral input of the proportional integral controller.

15. The power supply system of claim 11, wherein the power converter is further configured to have a current given duty cycle, wherein the current limiting loop is a closed-loop controller, wherein the closed-loop controller is a proportional integral controller without a steady-state error, and wherein the current limiting loop is further configured to:
identify that the current limiting reference duty cycle is greater than the current value of the given duty cycle; and
perform, in response to identifying that the current limiting reference duty cycle is greater than the current given duty cycle, clearing the integral input of the proportional integral controller.

16. The power supply system of claim 8, wherein the sampling controller is further configured to:
identify the bus reference duty cycle or the current limiting reference duty cycle as the given duty cycle; and
control, in response to identifying the bus reference duty cycle or the current limiting reference duty cycle as the given duty cycle, the power converter to run at the maximum power point.

17. A method implemented by a power conversion system and comprising:
- coupling a power supplier in parallel to a direct current (DC) bus of a power supply system via the power conversion system;
- tracking a maximum power point of the power supplier of the power supply system;
- determining a bus reference voltage of the DC bus of the power supply system and a power supply reference voltage of the power supplier based on the maximum power point;
- determining a bus reference duty cycle based on the bus reference voltage;
- determining a power supply reference duty cycle based on the power supply reference voltage;
- determining a current limiting reference duty cycle based on a preset current-limit value of the power conversion system;
- determining a given duty cycle of the power conversion system identified from the bus reference duty cycle, the power supply reference duty cycle, and the current limiting reference duty cycle;
- identifying whether the bus reference duty cycle is greater than a current value of the given duty cycle of the power conversion system;
- performing, in response to identifying that the bus reference duty cycle is greater than the current value of the given duty cycle, clearing of an integral input of a linear controller of the power conversion system used to determine the bus reference duty cycle; and
- controlling, based on the given duty cycle, a power transistor of the power conversion system to work to control the DC bus to have a target bus voltage and enable the power conversion system to run at the maximum power point.

18. The method of claim 17, further comprising:
- performing, by a power supply voltage loop of the power conversion system, maximum power point tracking control on the power supplier; and
- further determining, by the power supply voltage loop, the power supply reference duty cycle based on the power supply reference voltage;
- further determining, by a bus voltage loop of the power conversion system, the bus reference duty cycle based on the bus reference voltage; and
- further determining, by a current limiting loop of the power conversion system, the current limiting reference duty cycle based on the preset current-limit value.

19. The method of claim 18, further comprising:
- determining a smallest reference duty cycle among the bus reference duty cycle, the power supply reference duty cycle, and the current limiting reference duty cycle as the given duty cycle;
- outputting, by the bus voltage loop, the given duty cycle when the smallest reference duty cycle is the bus reference duty cycle;
- outputting, by the power supply voltage loop, the given duty cycle when the smallest reference duty cycle is the power supply reference duty cycle; and
- outputting, by the current limiting loop, the given duty cycle when the smallest reference duty cycle is the current limiting reference duty cycle.

20. The method of claim 19, further comprising:
- identifying the bus reference duty cycle or the current limiting reference duty cycle as the given duty cycle; and
- controlling, in response to identifying the bus reference duty cycle or the current limiting reference duty cycle as the given duty cycle, the power conversion system to run at the maximum power point.

* * * * *